R. D. MURO.
VEHICLE WHEEL.
APPLICATION FILED OCT. 29, 1910.
1,036,685.
Patented Aug. 27, 1912.
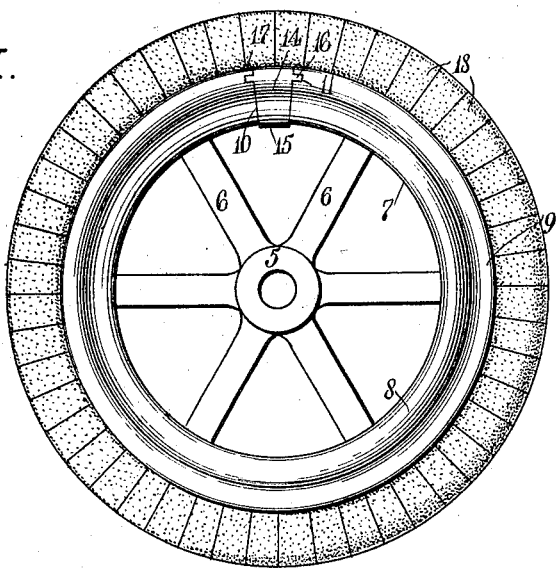
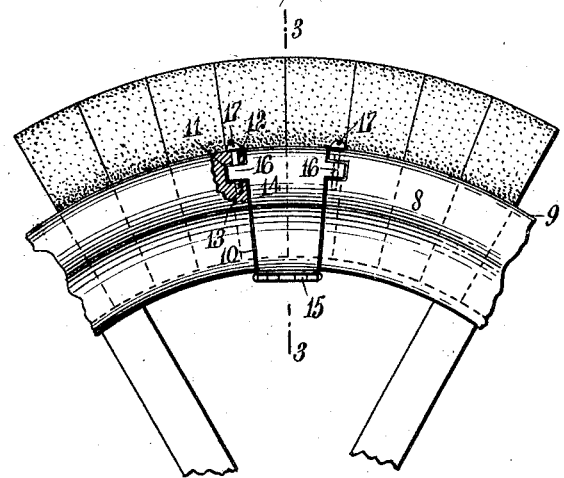
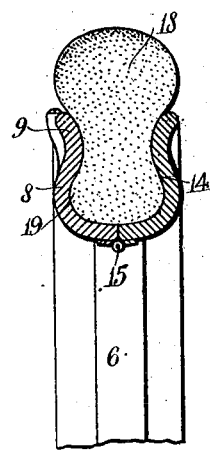
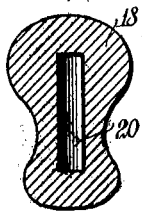
WITNESSES:
INVENTOR
Raul Diez Muro
BY Munn & Co.
ATTORNEYS

UNITED STATES PATENT OFFICE.

RAUL DIEZ MURO, OF HABANA, CUBA.

VEHICLE-WHEEL.

1,036,685.  Specification of Letters Patent.  Patented Aug. 27, 1912.

Application filed October 29, 1910. Serial No. 589,656.

*To all whom it may concern:*

Be it known that I, RAUL DIEZ MURO, a citizen of the Republic of Cuba, and a resident of Habana, Cuba, have invented a new and Improved Vehicle-Wheel, of which the following is a full, clear, and exact description.

My invention relates to vehicle wheels and it has for its object to provide one with a rim having converging sides so that tire sections having lateral extensions at their inner ends may be held between the sides of the rim to be slid into position, the tire sections being introduced through an opening in one of the sides of the rim which is normally closed by a door hinged to the rim.

Other objects of the invention will appear in the following specification in which the preferred form of my invention is disclosed.

In the drawings similar characters of reference indicate corresponding parts in all the views, in which—

Figure 1 is a side elevation of the invention; Fig. 2 is an enlarged fragmentary view showing the door at the side of the rim; Fig. 3 is a sectional view on the line 3—3 of Fig. 2; and Fig. 4 is a sectional view of one of the tire sections.

By referring to the drawings it will be seen that the vehicle wheel is provided with the usual hub 5 and spokes 6, said spokes 6 having their outer terminals secured to the rim 7. This rim 7 has sides 8, which converge inwardly the terminals 9 of the sides being bent slightly outwardly. There is an opening 10 in one of the sides 8 of the rim there being recesses 11 in the said side, which connect with the said opening 10. The side of the rim having the said opening 10 is provided with orifices 12 and 13, the orifices 13 being threaded. A door 14 is provided for closing the opening 10, this door 14 having lugs 16, which are adapted to be disposed in the recesses 11 when the door is closed, screws 17 being provided which extend through the orifices 12, and orifices in the lugs 16, the threads on the said screws 17 meshing in the threaded orifices 13, by which means the screws are adapted to hold the door 14 secure after it has been closed. When the door 14 is open, tire sections 18 are introduced in the rim 7, these tire sections 18 having lateral extensions 19 on their inner sides, which are adapted to be disposed against the sides 8 of the rim by which means the tire sections are prevented from slipping out of the rim. When the tire sections 18 are introduced in the rim through the opening 10, they are slid around in the rim into position, it being possible to move the tire sections 18 around the rim to any desired position. When a sufficient number of tire sections has been introduced through the opening 10 to form a continuous tire surface, around the rim, the door 14 is closed, and is held secure in the manner described. These tire sections 18 may be constructed of cork, rubber or other similar material; when the tire sections are constructed of rubber I prefer to provide them with air chambers 20 which will lessen their weight, and make them more resilient. It will be readily understood that the tire sections 18 taper toward their inner ends, so that the opposite face of each tire section will be disposed against the tire face of its neighboring tire sections from its inner to its outer end.

Having thus described my invention, I claim as new and desire to secure by Letters Patent:

A vehicle wheel having a rim with converging sides there being an opening in one of the sides of the rim, recesses at each side communicating with the opening, and orifices in the rim extending to the recesses, a plurality of tire sections having lateral inner extensions adapted to be introduced into the rim through the said opening to be slid around the rim into position, and a door hinged to the rim for closing the opening and having lateral extensions, and threaded orifices, which are normally disposed in the recesses in the rim, and screws disposed in the orifices and meshing in the threaded orifices in the lateral extension.

In testimony whereof I have signed my name to this specification in the presence of two subscribing witnesses.

RAUL DIEZ MURO.

Witnesses:
 HENRY P. STANETT,
 A. ROGERS.

---

Copies of this patent may be obtained for five cents each, by addressing the "Commissioner of Patents, Washington, D. C."